(12) United States Patent
Worden, IV et al.

(10) Patent No.: US 11,337,560 B2
(45) Date of Patent: May 24, 2022

(54) SHOWER CADDY

(71) Applicant: Helen of Troy Limited, St. Michael (BB)

(72) Inventors: Morris Elijah Worden, IV, New York, NY (US); William Jack Merrill, London (GB); Conor McNamara, Montclair, NJ (US); Daniel Juda, Brooklyn, NY (US)

(73) Assignee: Helen of Troy Limited, St. Michael (BB)

( * ) Notice: Subject to any disclaimer, the term of this patent is extended or adjusted under 35 U.S.C. 154(b) by 201 days.

(21) Appl. No.: 16/585,517

(22) Filed: Sep. 27, 2019

(65) Prior Publication Data
US 2020/0281414 A1    Sep. 10, 2020

Related U.S. Application Data

(60) Provisional application No. 62/813,221, filed on Mar. 4, 2019.

(51) Int. Cl.
*A47K 3/28* (2006.01)
*F16H 25/20* (2006.01)

(52) U.S. Cl.
CPC .............. *A47K 3/281* (2013.01); *F16H 25/20* (2013.01); *F16H 2025/2043* (2013.01); *F16H 2025/2053* (2013.01)

(58) Field of Classification Search
CPC .......... A47K 3/281; A47K 5/00; A47K 10/10; A47K 3/00; F16H 25/20; F16H 2025/2043; F16H 2025/2053; A47B 96/16; A47G 25/0614; F16B 7/0413; Y10T 403/32081

USPC ........ 211/1.3, 119.004, 118; 248/215, 227.1, 248/304, 322, 339–341, 918, 924
See application file for complete search history.

(56) References Cited

U.S. PATENT DOCUMENTS

| | | | | |
|---|---|---|---|---|
| 658,716 | A * | 9/1900 | Whitaker | A47F 5/0006 248/691 |
| 2,957,667 | A * | 10/1960 | Kughler | A22C 15/003 248/339 |
| 5,375,799 | A * | 12/1994 | Rhodes | A61G 7/0503 128/DIG. 24 |
| 7,178,769 | B2 * | 2/2007 | Magnusson | A47B 96/1416 211/119.004 |

(Continued)

FOREIGN PATENT DOCUMENTS

DE        202017102988        7/2017

OTHER PUBLICATIONS

European Search Report filed in EP 20 16 0777 dated Jul. 22, 2020.

*Primary Examiner* — Hiwot E Tefera
(74) *Attorney, Agent, or Firm* — Rankin, Hill & Clark LLP

(57) ABSTRACT

A shower caddy for attachment to an associated outer enclosure panel or door of an associated shower or tub enclosure includes a body and an attachment mechanism mounted on an end portion of the body. The attachment mechanism has at least one movable mounting arm. The attachment mechanism is configured such that downward movement of the body relative to the attachment mechanism by force of gravity moves the at least one mounting arm from a rest position toward an engagement position where the at least one mounting arm is engageable with the associated outer enclosure panel or door.

19 Claims, 12 Drawing Sheets

(56) References Cited

U.S. PATENT DOCUMENTS

| | | | |
|---|---|---|---|
| 7,740,222 B2* | 6/2010 | Wang | F16M 13/022 |
| | | | 248/691 |
| 8,235,261 B1* | 8/2012 | Park | A47G 25/4023 |
| | | | 223/94 |
| 8,360,381 B2 | 1/2013 | Lee | |
| 8,556,091 B2 | 10/2013 | Cutler | |
| 10,477,776 B1* | 11/2019 | Kacines | A01G 5/04 |
| 2004/0094494 A1* | 5/2004 | Klein | A47B 81/02 |
| | | | 211/119.004 |
| 2010/0155350 A1* | 6/2010 | Kaplan | F16B 12/26 |
| | | | 211/113 |
| 2011/0284597 A1* | 11/2011 | Kaleta | A47G 25/50 |
| | | | 223/85 |
| 2014/0361128 A1 | 12/2014 | Plikat et al. | |
| 2017/0202374 A1 | 7/2017 | Kressin | |
| 2018/0027997 A1 | 2/2018 | Kressin | |
| 2018/0235409 A1 | 8/2018 | Ciavarella et al. | |
| 2019/0120422 A1* | 4/2019 | Zhang | F16M 13/02 |

* cited by examiner

SHOWER CADDY

The present application claims priority to U.S. Prov. Pat. App. Ser. No. 62/813,221 filed Mar. 4, 2019, the disclosure being incorporated herein by reference.

BACKGROUND

Shower caddies are popular devices for providing primary or additional storage space for articles of personal hygiene (e.g., shampoo, conditioner, soap, etc.) used in showers or tubs. There are many forms of these shower caddies which can be positioned in various locations within the shower or tub. One known shower caddy can be attached to the walls of the shower, for example, by suction cups. Another known shower caddy can be attached to a shower arm, for example, by hanging the shower caddy on the arm. Further, another type of shower caddy is provided with a hook for hanging the shower caddy on an outer enclosure panel or door of a shower or tub enclosure; however, this type of shower caddy can easily move during use.

SUMMARY

According to one aspect, a shower caddy for attachment to an associated outer enclosure panel or door of an associated shower or tub enclosure comprises a body and an attachment mechanism mounted on an end portion of the body. The attachment mechanism has at least one movable mounting arm. The attachment mechanism is configured such that downward movement of the body relative to the attachment mechanism by force of gravity moves the at least one mounting arm from a rest position toward an engagement position where the at least one mounting arm is engageable with the associated outer enclosure panel or door.

According to another aspect, a shower caddy comprises a body and an attachment mechanism mounted on an end portion of the body for releasably attaching the shower caddy to an associated outer enclosure panel or door of an associated shower or tub enclosure. The attachment mechanism includes a cover for housing a drive assembly operable by movement of the body relative to the attachment mechanism. Mounting arms are connected to the drive assembly. The drive assembly is operably to move the mounting arms between a rest position where the mounting arms extend forward from the attachment mechanism and an open or engagement position where the mounting arms extends from opposite sides of the attachment mechanism for engaging the associated enclosure panel or door.

DETAILED DESCRIPTION

Figure 1:
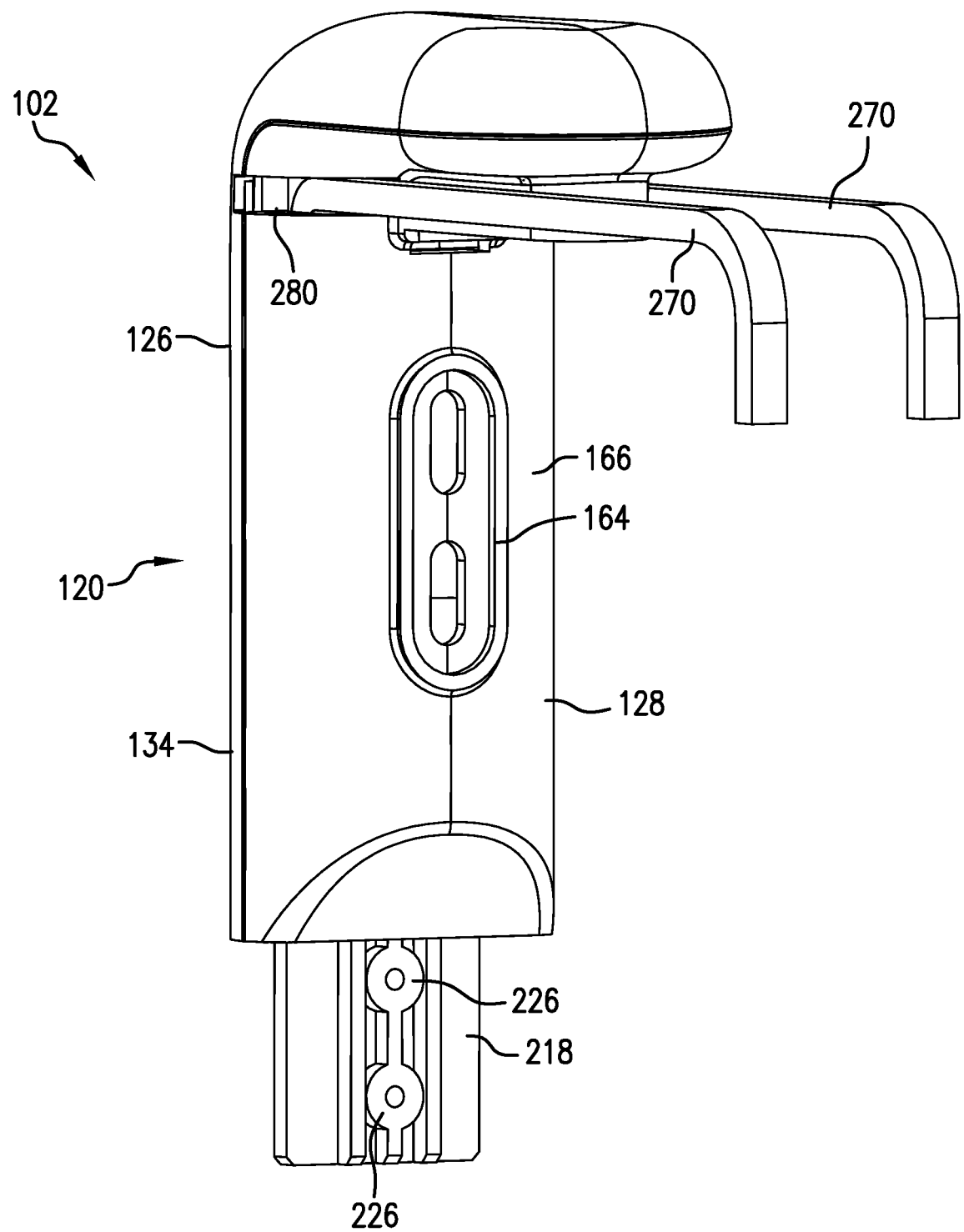
FIG. 1 is a perspective view of an attachment mechanism for a shower caddy according to one aspect of the present disclosure.
Figure 2:
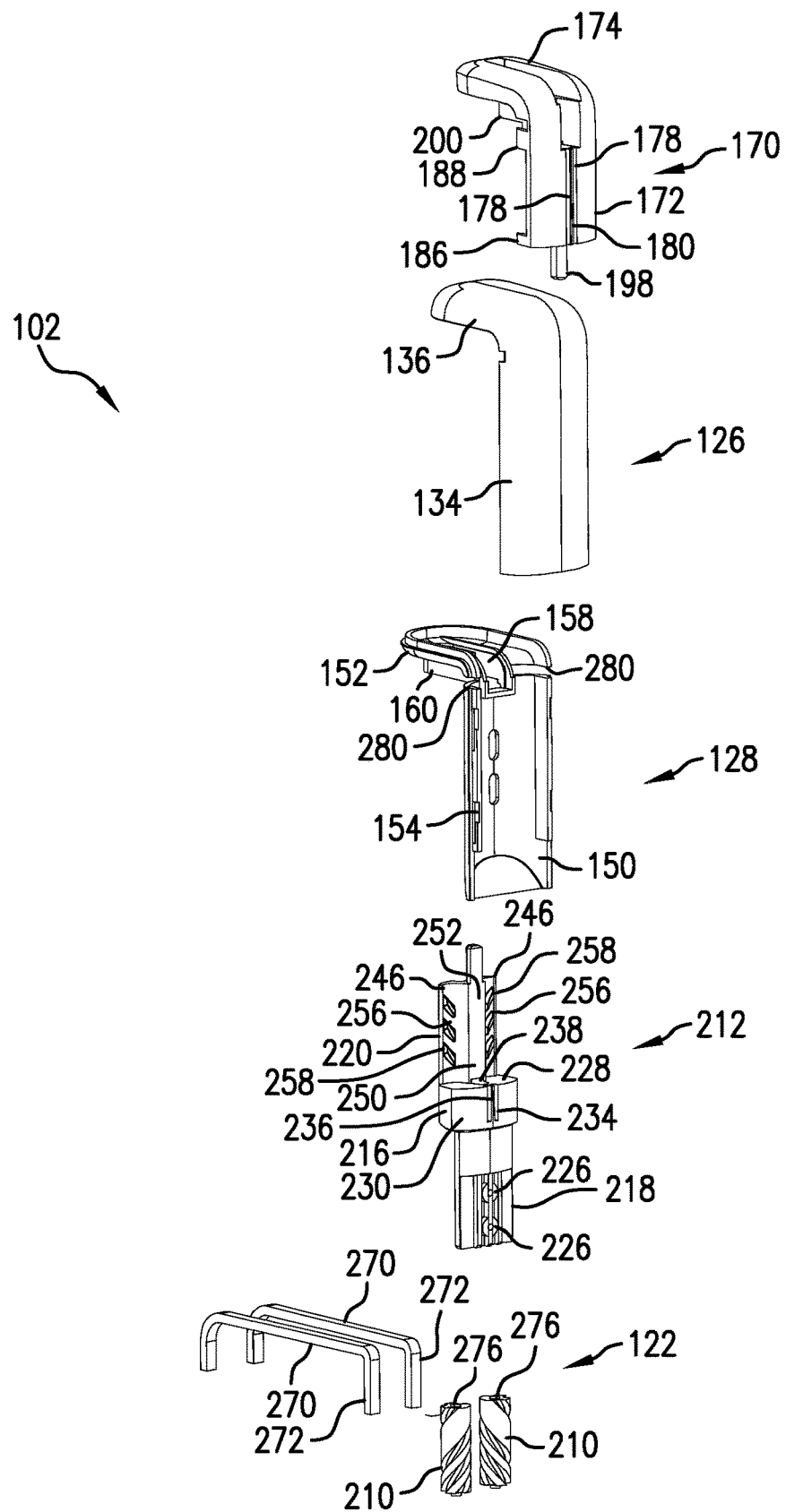
FIGS. 2 and 3 are exploded views of the attachment mechanism of FIG. 1.
Figure 3:
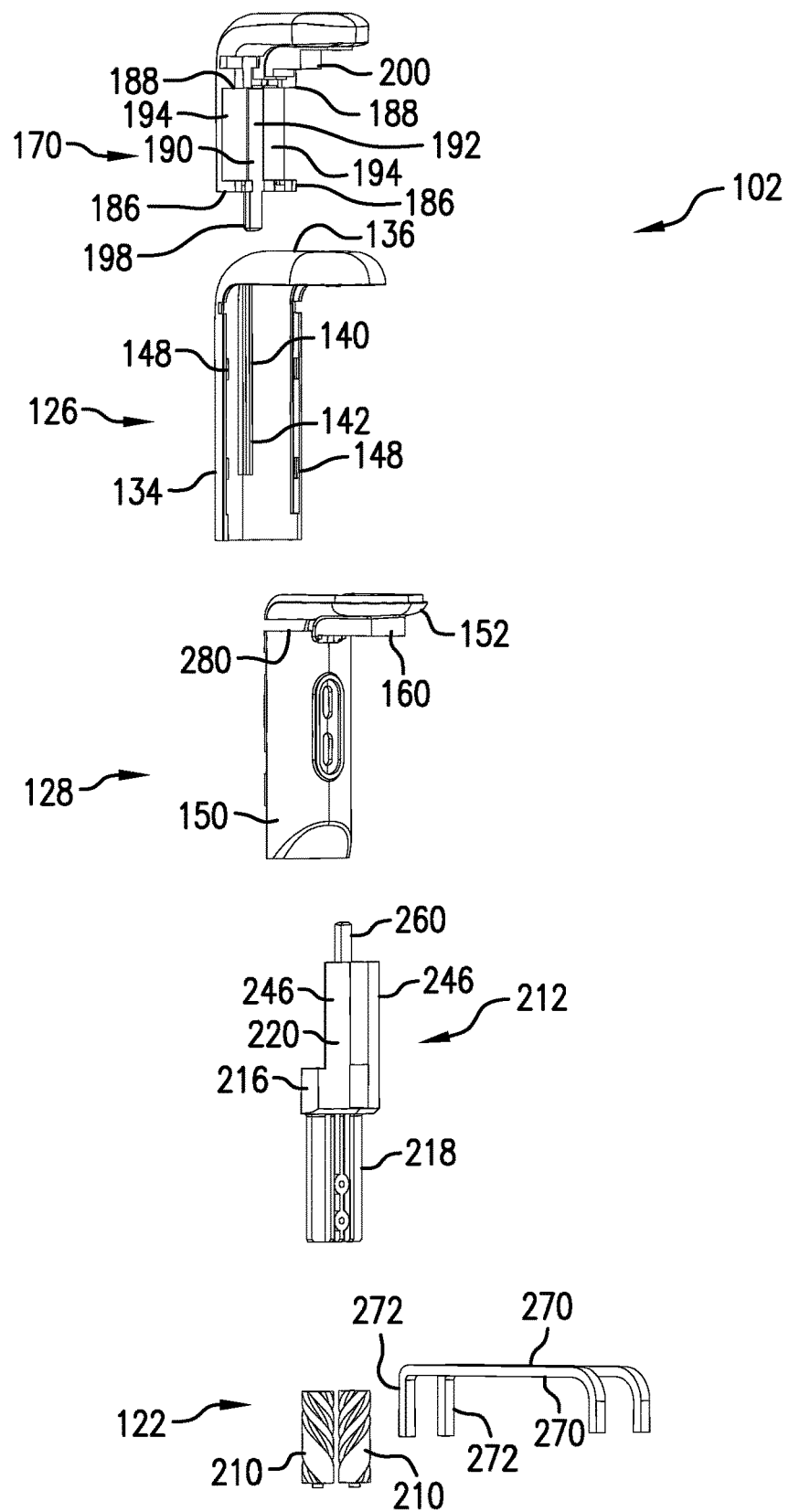
Figure 8:
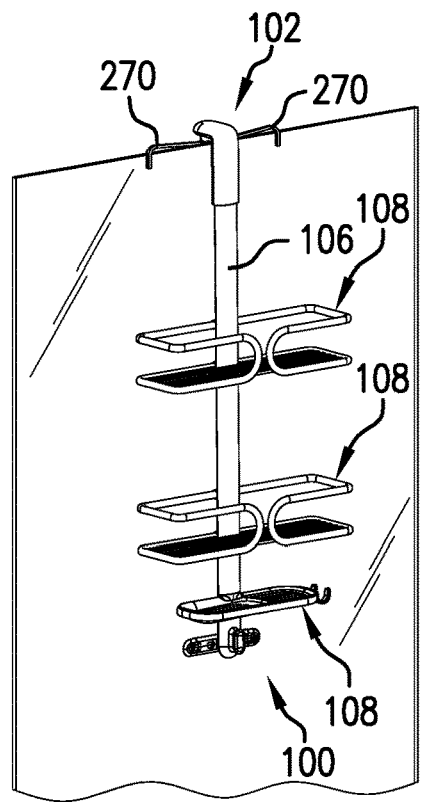
FIG. 8 depicts the shower caddy hanging on the outer enclosure panel or door of a shower with the attachment mechanism of FIG. 1 in the open position.
Figure 9:
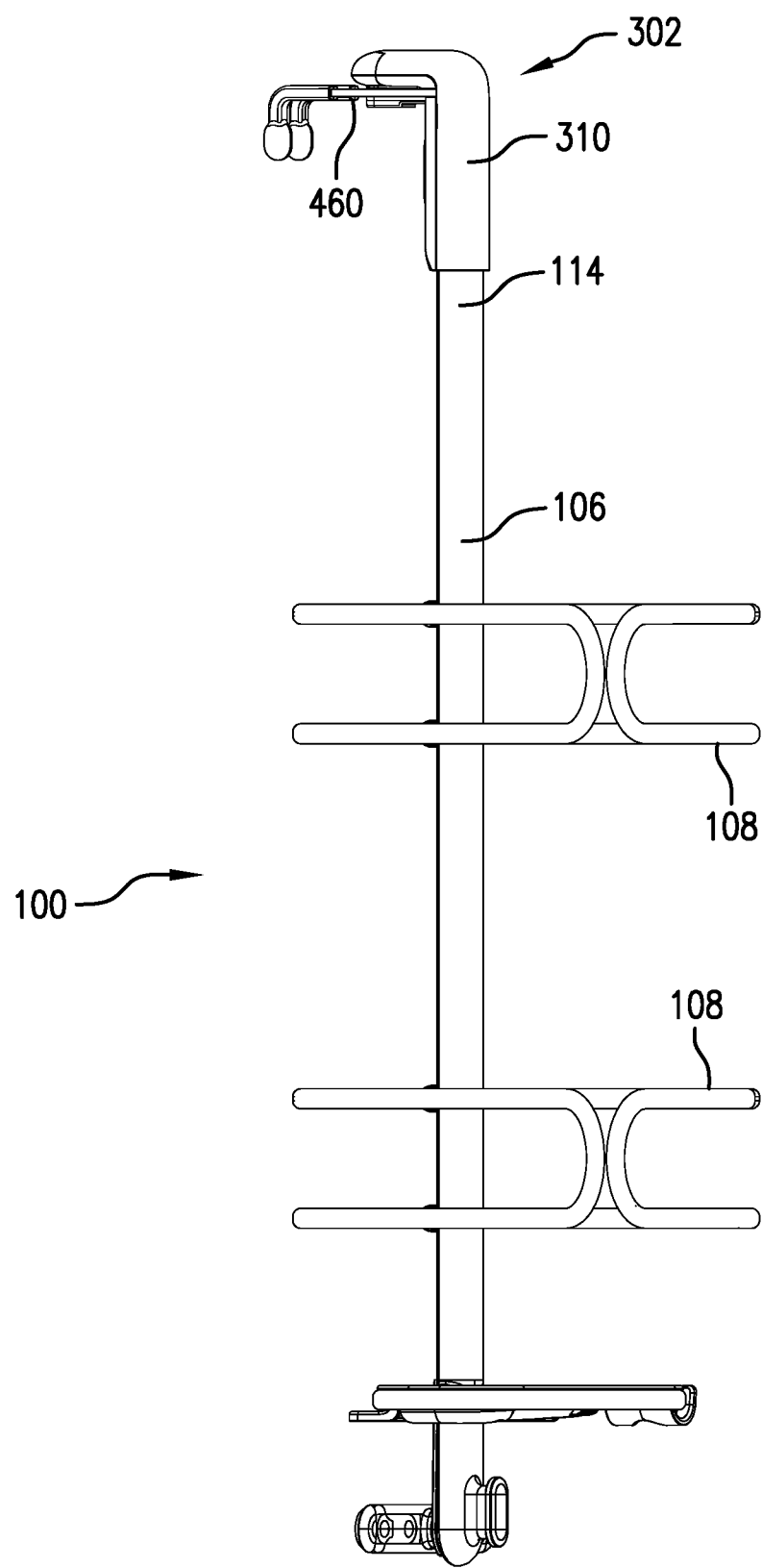
FIG. 9 is a perspective view of the shower caddy including an attachment mechanism according to another aspect of the present disclosure.
Figure 10:
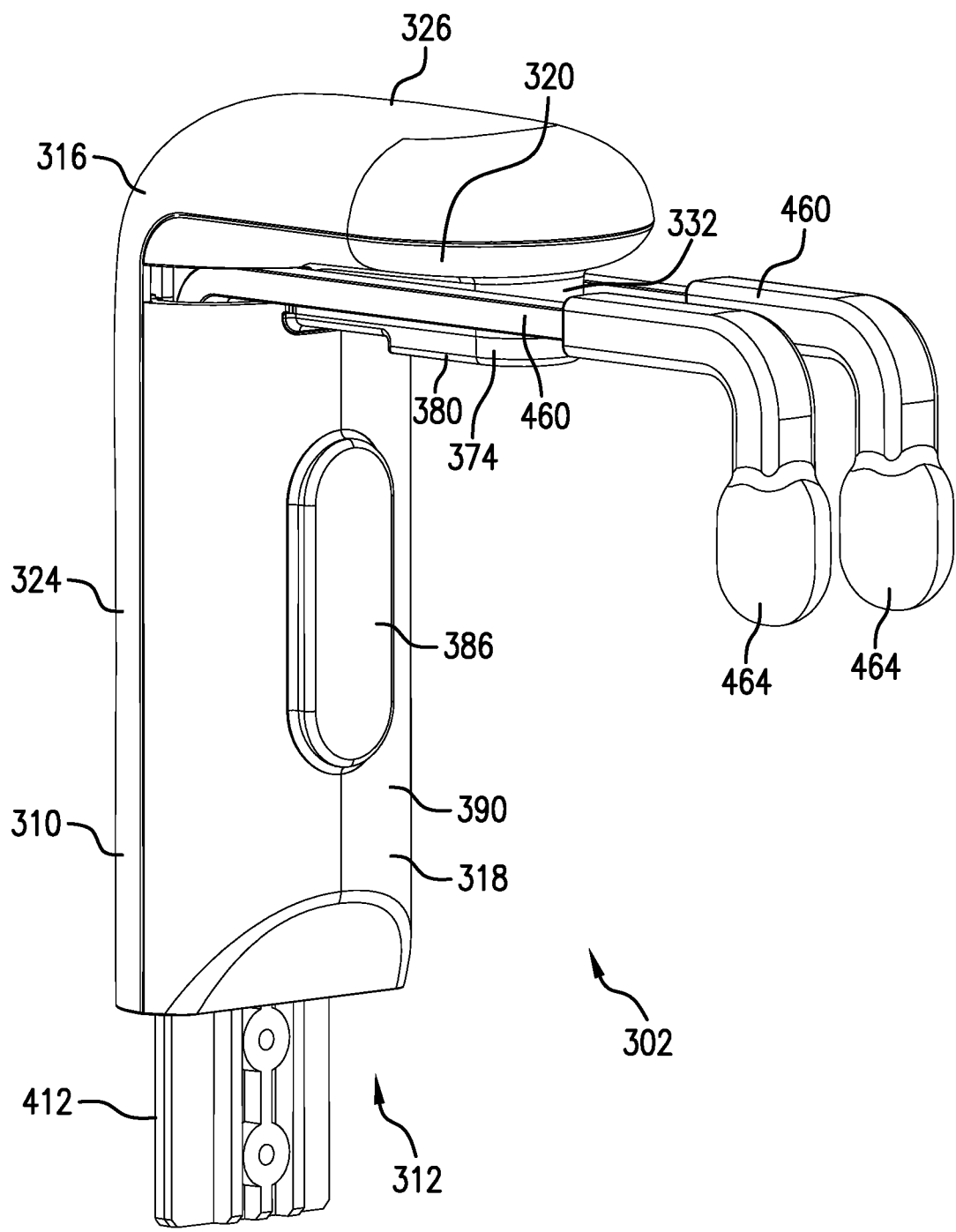
FIG. 10 is a perspective view of the attachment mechanism of FIG. 9.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1 and 8 illustrate a shower caddy 100 having mounted thereto an attachment mechanism 102 according to one aspect of the present disclosure. The shower caddy 100 includes a body 106 configured to support at least one shelf 108. In the depicted aspect, the body 106 is an elongated support member or spine and is referred to herein as a spine; although, it should be appreciated that alternative configurations for the body 106 are contemplated. A clamping mechanism (not shown) can be provided to secure the shelf 108 the spine 106. The clamping mechanism can be configured to allow a user to adjust a position of the shelf 108 in addition to holding it in place on the spine 106, as is known in the art. The exemplary attachment mechanism 102 is mounted to an end portion 114 of the spine 106.

With reference to FIGS. 1-4, the attachment mechanism 102 include a cover 120 for housing a drive assembly 122. The cover 120 is fitted on the end portion 114 of the spine 106 and includes an upper or first cover part 126 and a lower or second cover part 128. The upper cover part 126 includes a first portion 134 which extends in a longitudinal direction parallel to the spine 106 and a second portion 136 which extends perpendicular from the first portion 134. A guide 140 is provided on an inner surface of the first portion 134. The guide 140 can be defined by spaced elongated flanges 142 integral with the first portion 134 that extend in the longitudinal direction. Further provided on opposite sides of the first portion 134 are spaced mounting tabs 148, and a mounting boss (not visible) depends from an inner surface of the second portion 136. The lower cover part 128 includes a first portion 150 which extends in the longitudinal direction and a second portion 152 which extends perpendicular from the first portion 150. Opposite sides of the first portion 150 include slots 154 sized to receive the mounting tabs 148. In the depicted aspect, the slots 154 have an inverted L-shape for securing the mounting tabs 148 when the upper cover part 126 is attached to the lower cover part 128. The second portion 152 includes an elongated cutout or channel 158 and a wall 160 depending from an outer surface of the second portion at least partially frames the channel 158. A first friction pad (not shown) can be attached to a mounting flange 164 provided on a face 166 of the first portion 150, and a second friction pad (not shown) can be mounted to the 160.

A support member 170 is housed within the cover 120. The support member 170 includes a first portion 172 and a second portion 174. The first portion 172 is received by the first portions 134, 150 of the upper and lower cover parts 126, 128. In the depicted aspect, a pair of elongated channels 178 are provided on an outer surface of the first portion 172. The channels 178 define therebetween an elongated rib 180. In the assembled condition of the attachment mechanism 102, the flanges 142 of the guide 140 of the upper cover part 126 are received in the channels 178 with the elongated rib 180 received between the flanges 142. A pair of lower platforms 186 and a pair of corresponding upper platforms 188 project from an inner surface of the first portion 172. The lower and upper platforms 186, 188 are separated by a divider 190 having a planar surface 192. The divider 190 at least partially defines of a pair of arcuate shaped recessed portions 194 formed in an inner surface of the first portion 172. The lower platforms 186 are located at lower ends of the recessed portions 194 and the upper platforms 188 are located at upper ends of the recessed portions 194. A post 198 projects downward from the divider 190. The second portion 174 is received by the second portions 136, 152 of the upper and lower cover parts 126, 128. A mounting block 200 provided on an inner surface of the second portion 174 is sized to be received in the channel 158 of the lower cover part 128. Further, the support member 170 can be affixed to mounting boss of the upper cover part 126.

As indicated previously, the cover 120 houses a drive assembly 122. With continued reference to FIGS. 2-4, the drive assembly 122 includes at least one lead screw 210 (for example, an ACME screw) and a displaceable drive member 212 for driving the at least one lead screw. In the depicted aspect, a pair of lead screws 210 is provided for the drive assembly 122. The lead screws 210 are adapted to be rotationally supported by the lower and upper platforms 186, 188 of the support member 170, with the recessed portions 194 shaped to conform to the exterior of the lead screws 210. In the depicted aspect, the drive member 212 includes a base 216, a connector 218 extending downwardly from the base 216, and a wall 220 extending upwardly from the base 216. The connector 218 is affixed to the end portion 114 of the spine 106. By way of example, the connector 218 can be inserted into the end portion 114 and secured thereto by fasteners threadingly engaging mounting bosses 226 integrally provided as part of the connector 218. The base 216 includes a top surface 228 and an outer surface 230. The outer surface 230 includes a pair of elongated channels 234 which define therebetween an elongated rib 236. Similar to the support member 170, in the assembled condition of the attachment mechanism 102 the channels 234 and elongated rib 236 are mounted in the guide 140 of the upper cover part 126. The top surface 228 includes a bore 238 sized to receive the post 198 of the support member 170. The wall 220 is defined by a pair of arcuate portions 246 separated by a divider 250 having a planar surface 252, which contacts the planar surface 192 of the divider 190. The arcuate portions 246 correspond in shape to the recessed portions 194 of the support member 170, and, in turn, to the exterior of the lead screws 210. Each of the arcuate portions 246 includes spaced angled ribs 256 which together define a male threaded section 258 for threadingly engaging one of the lead screws 210. A post 260 projects upward from the divider 250 and is received by the mounting block 200 of the support member 170.

Figure 4:
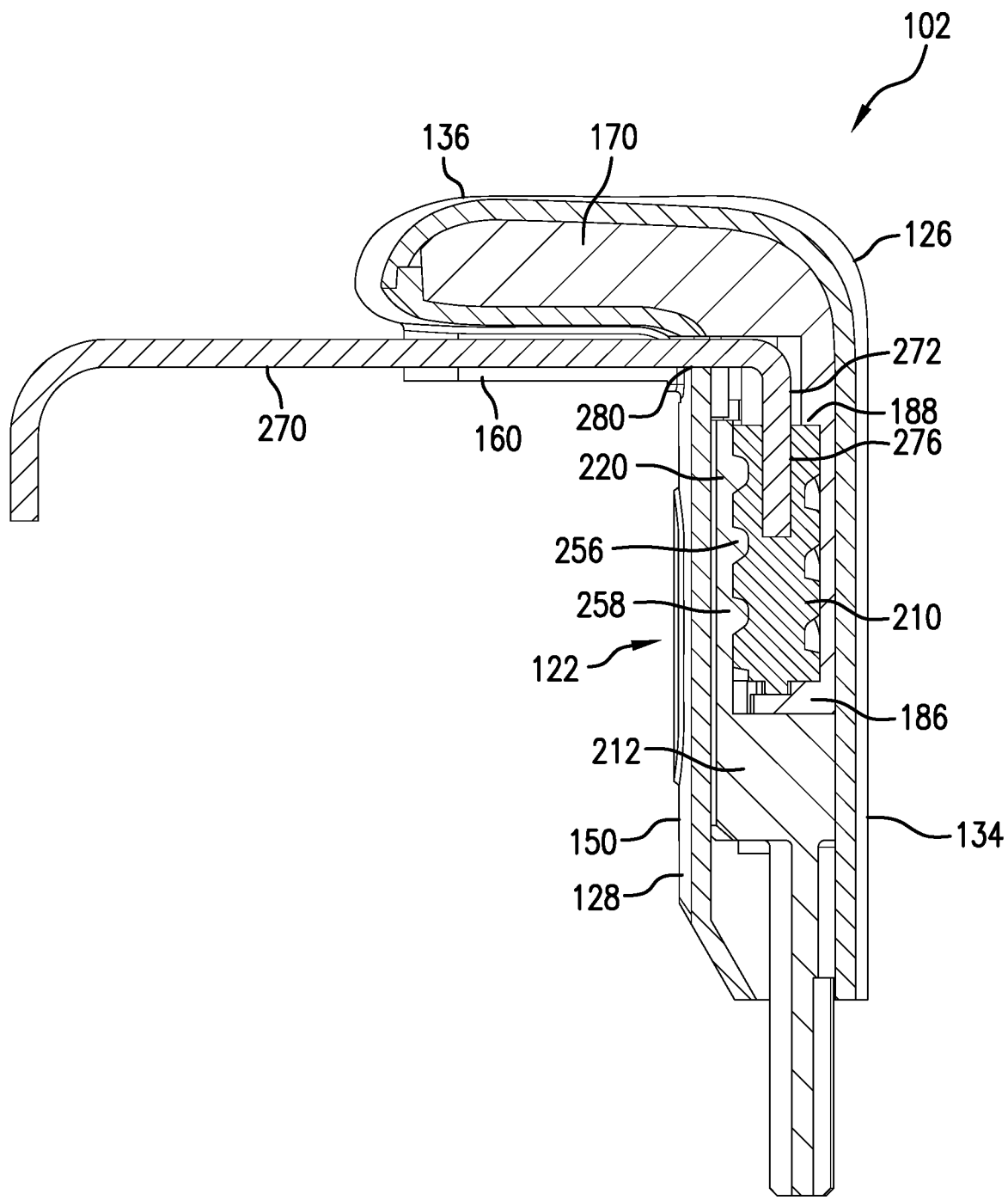
FIG. 4 is a cross-sectional view of the attachment mechanism of FIG. 1.

The drive assembly 122 is operable to move at least one mounting arm or hook 270 between a rest state or position and an open or engagement state or position. In the depicted embodiment, the drive assembly 122 is operable to move a pair of mounting arms or hooks 270 between a rest state or position (where the mounting arms 270 extend forward from the cover 120) and an open or engagement state or position (where the mounting arms 270 extend from opposite sides of the cover 120) (see FIGS. 5, 6A, 6B). As shown in FIG. 4, the mounting arms 270 are secured to the lead screws 210. By way of example, the mounting arms 270 can have downwardly bent end portions 272 which are securely received in axial bores 276 in the lead screws 210. It should be appreciated that as the drive member 212 is vertically displaced (see FIGS. 6A and 6B) the lead screws 210 are caused to rotate in opposite directions from one another via the threaded sections 258 of the drive member 212 which, in turn, moves the mounting arms 270. As apparent from FIG. 5, the mounting arms 270 rotate together and in sync with the vertical movement of the drive member 212. To allow for the movement of the mounting arms 270 between its two positions the cover 120 includes slotted openings 280 for the mounting arms. FIG. 4 shows that the cover 120 (particularly the second cover part 128) is shaped to limit the vertical displacement of the drive member 212 shown in FIGS. 6A and 6B.

Figure 5:
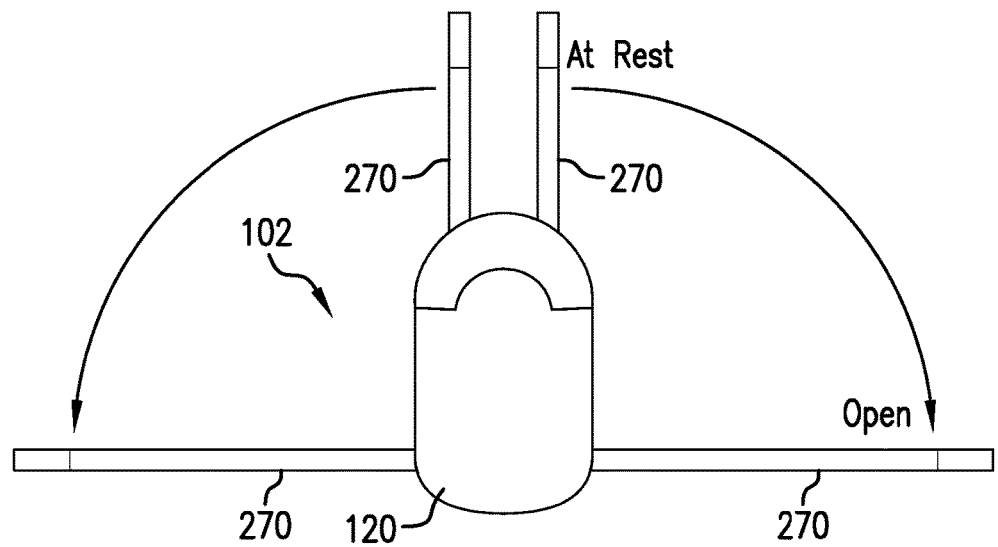
FIG. 5 depicts the attachment mechanism in a rest position and an open or engagement position.
Figure 7:
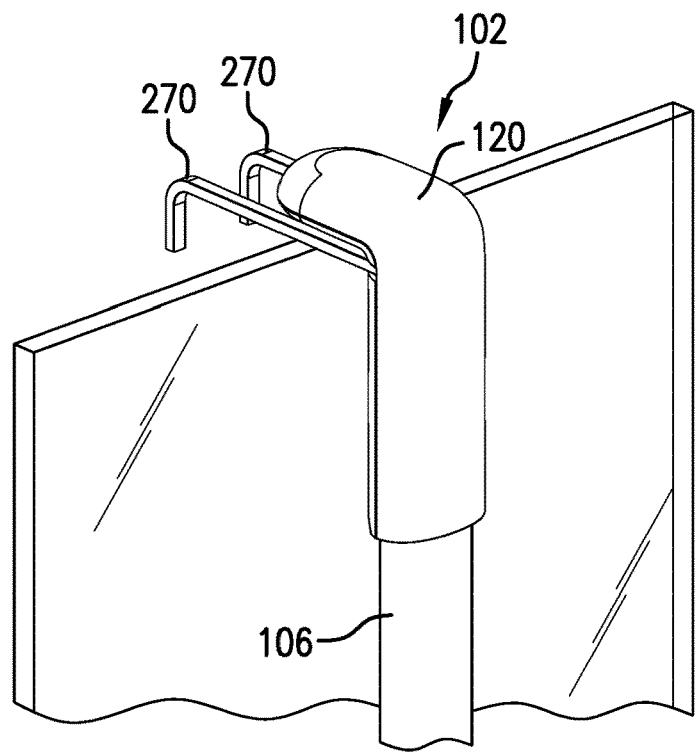
FIG. 7 depicts the shower caddy hanging on an outer enclosure panel or door of a shower with the attachment mechanism of FIG. 1 in the rest position.

Therefore, as the user places the exemplary attachment mechanism 102 of the shower caddy 100 over the top of an outer enclosure panel or door of a shower (see FIG. 7) the force imparted on the mounting arms 270 from the downward weight of the shower caddy 100 (i.e., from the force of gravity) will cause the drive member 212 to move downward rotating the lead screws 210 about axes that extend parallel to the force of gravity. This, in turn, causes the mounting arms 270 to rotate until they grasp the back side of the enclosure panel or door (see FIG. 8). As shown in FIG. 5, the mounting arms 270 move in a common plane that is transverse to the force of gravity. It should be appreciated that the more weight that is placed on the shower caddy 100 the tighter the mounting arms 270 hold the shower caddy 100 in place. When the shower caddy is to be removed, the user can move the spine 106 back toward the attachment mechanism 102, which vertically displaces the drive member 212 back into the cover 120. As the drive member 212 moves the lead screws 210 rotate in an opposite direction, thereby moving the mounting arms 270 to their respective rest positions.

FIG. 9-14 illustrate the shower caddy 100 having mounted thereto an attachment mechanism 302 according to another aspect of the present disclosure. Again, the shower caddy 100 includes the body 106 (for example, the depicted elongated support member or spine) configured to support at least one shelf 108. The exemplary attachment mechanism 302 is mounted to the end portion 114 of the spine.

Similar to the attachment mechanism 102, the attachment mechanism 302 includes a cover 310 for housing a drive assembly 312. The cover 310 includes a first cover part 316, a second cover part 318, and a third cover part 320. The first cover part 316 includes a first portion 324 which extends in a longitudinal direction parallel to the spine 106 and a second portion 326 which extends perpendicular from the first portion 324. The second cover part 318 is affixed to the first portion 324, and the third cover part 320 is affixed to the second portion 326. The third cover part 320 includes an elongated cutout or channel 330 and a wall 332 depending from an outer surface of the third cover part at least partially frames the channel 330.

A support member 340 is housed within the cover 310. The support member 340 includes a first portion 342 and a second portion 344 which extends perpendicular from the first portion 324. A pair of lower platforms 346 and a pair of corresponding upper platforms 348 project from an inner surface of the first portion 324. The lower and upper platforms 346, 348 are separated by a divider 350. The divider also separates a pair of arcuate shaped recessed portions 354 formed in an inner surface of the first portion 324. The lower platforms 346 are located at lower ends of the recessed portions 354 and the upper platforms 348 are located at upper ends of the recessed portions 354. A post 358 projects downward from the divider 350. An inner surface of the second portion 344 includes a mounting block 370 sized to be received in the channel 330 of the third cover part 320. The mounting block includes slotted guides 372 for mounting of a friction pad support 374. As shown, the friction pad support 374 includes a U-shaped wall 376 having opposed ribs 378 which are received in the slotted guides 372, and when mounted to the mounting block 370 the wall 376 is interposed between the wall 332 of the third cover part 320 and the mounting block. A first friction pad 380 attached below the wall 376 defines a first engaging surface for the cover 310. A second friction pad 386 is attached to a mounting flange 388 provided on a face 390 of the second cover part 318, and defines a second engaging surface for the cover 310.

With continued reference to FIGS. 11-14, the drive assembly 312 includes at least one lead screw 400 (for example, an ACME screw) and a displaceable drive member 402 for driving the at least one lead screw. In the depicted aspect, a pair of lead screws 400 is provided for the drive assembly 312. The lead screws 400 are adapted to be rotationally supported by the lower and upper platforms 346, 348 of the support member 340, with the recessed portions 354 shaped to conform to the exterior of the lead screws 400. In the depicted aspect, the drive member 402 includes a base 410, a connector 412 extending downwardly from the base 410, and a wall 416 extending upwardly from the base 410. The connector 412 is affixed to the end portion 114 of the spine 106. The base 410 includes a bore 420 sized to receive the post 358 of the support member 340. The wall 416 is defined by a pair of arcuate portions 430 separated by a divider 432. The arcuate portions 430 correspond in shape to the recessed portions 354 of the support member 340, and, in turn, to the exterior of the lead screws 400. Each of the arcuate portions 430 includes spaced angled ribs 438 which together define a male threaded section 440 for threadingly engaging one of the lead screws 400. A post 444 projects upward from the divider 432 and is received by a bore 448 defined in an extension 450 located beneath the mounting block 370 of the support member 340.

Figure 6A:
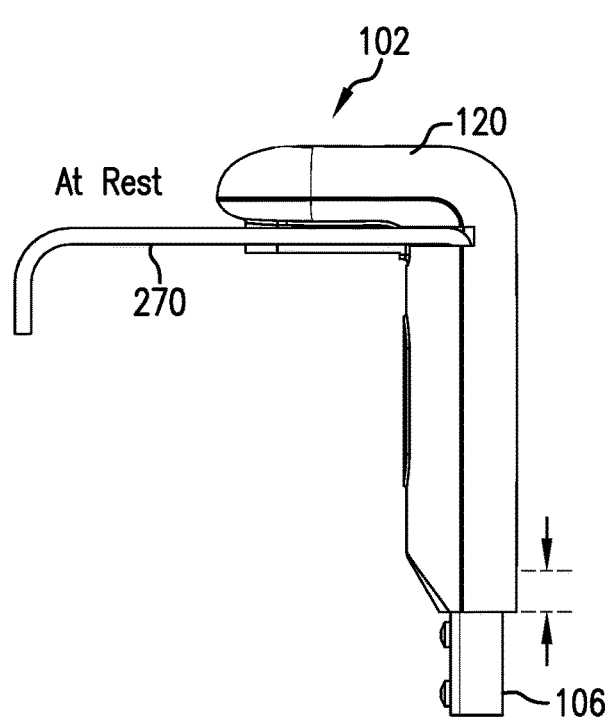
FIGS. 6A and 6B depict further depict the attachment mechanism of FIG. 1 in the rest position and open position.
Figure 6B:
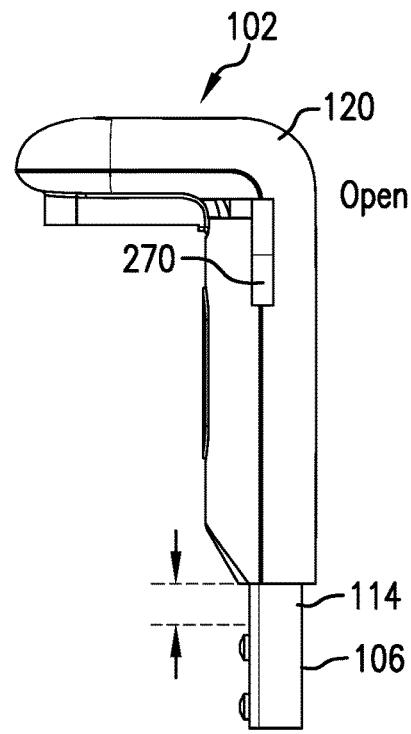
Figure 13:
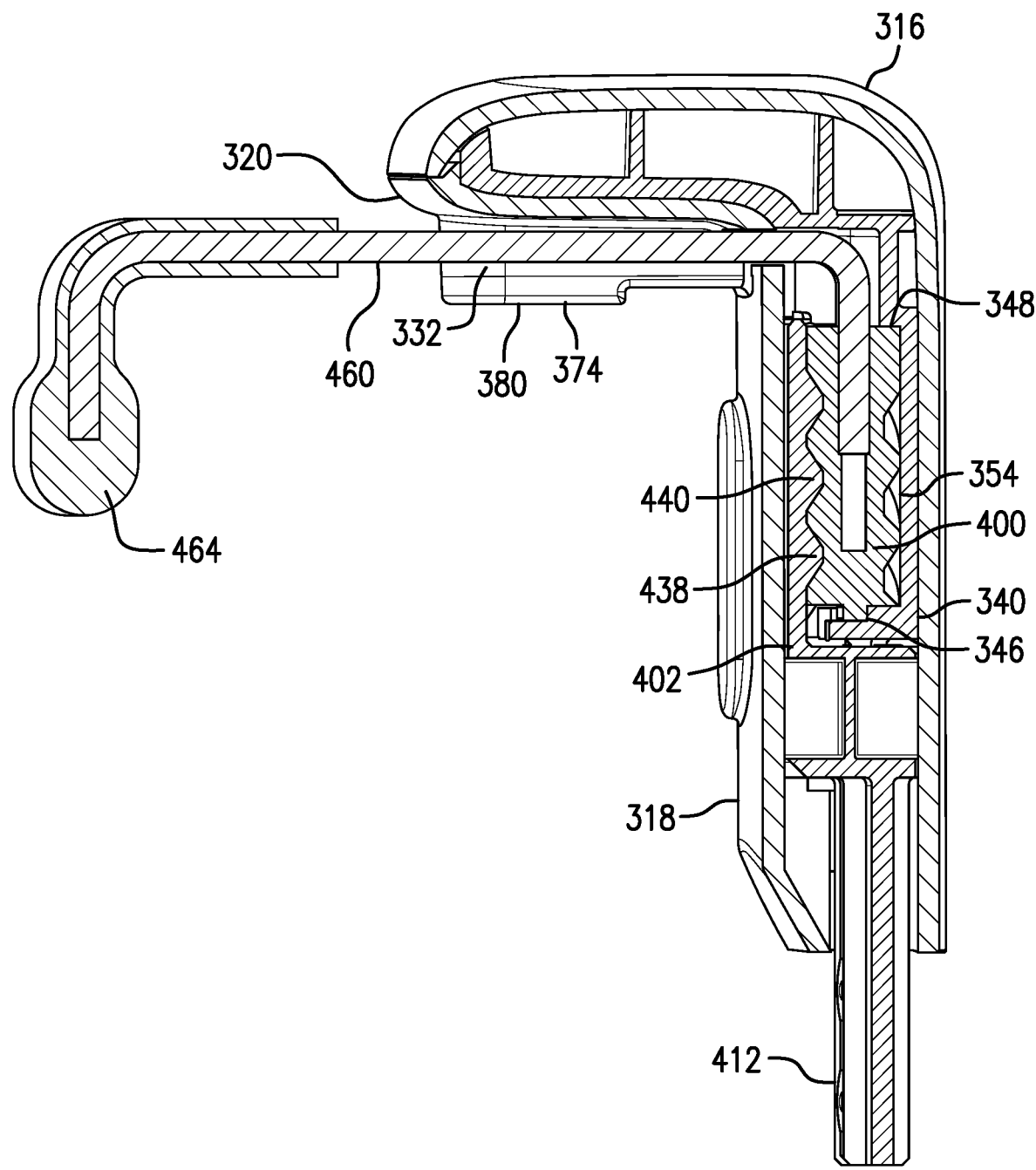
FIGS. 13 and 14 are cross-sectional views of the attachment mechanism of FIG. 9.
Figure 14:
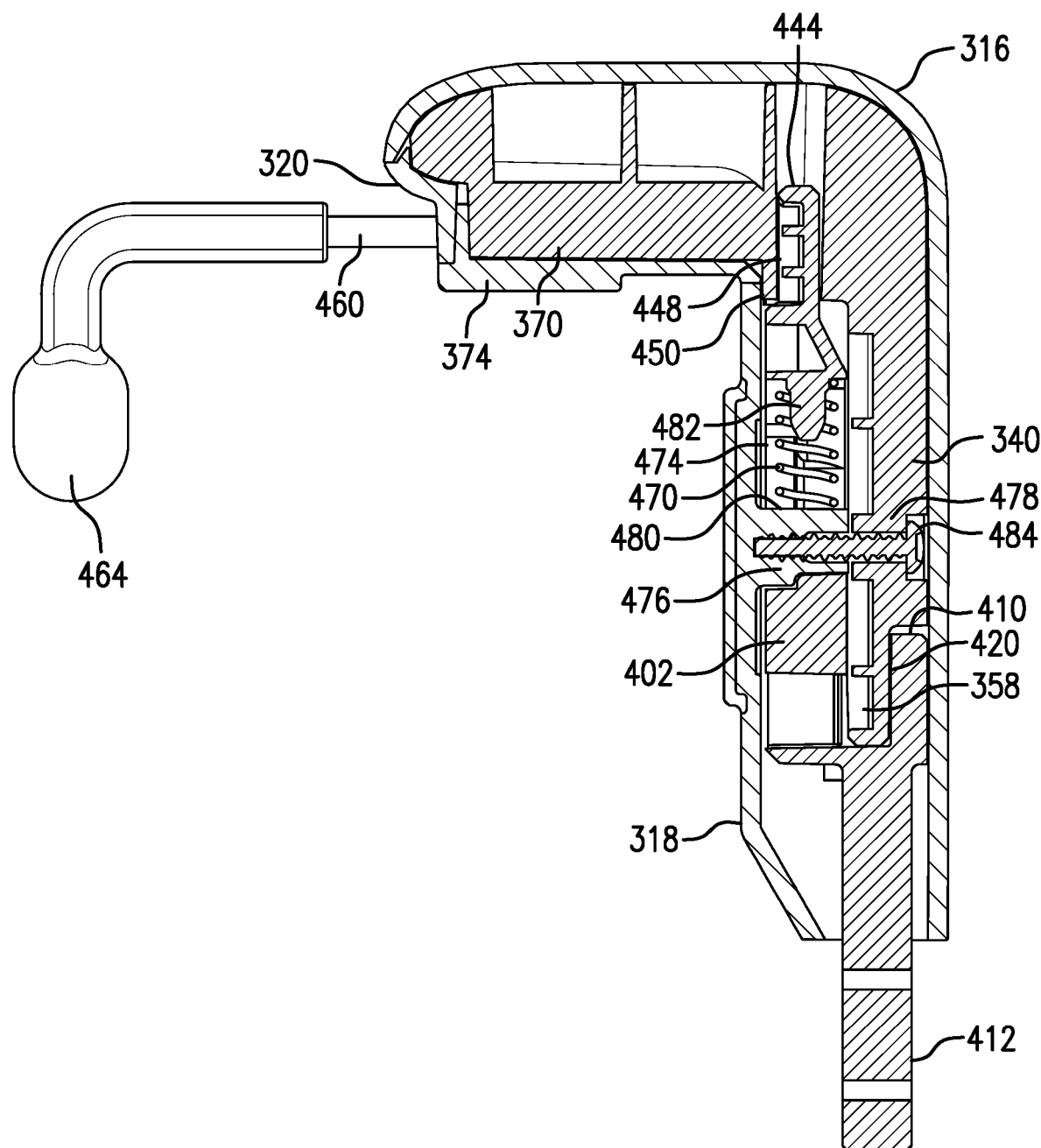

Similar to the drive assembly 122, the drive assembly 312 of the attachment mechanism 302 is operable to move at least one mounting arm or hook 460, particularly a pair of mounting arms or hooks 460, between a rest state or position (where the mounting arms 460 extend forward from the cover 120) and an open or engagement state or position (where the mounting arms 460 extend from opposite sides of the cover 120) (similar to the mounting arms 270 depicted in FIGS. 5, 6A, 6B). As shown in FIG. 13, the mounting arms 460 are secured to the lead screws 400. It should again be appreciated that as the drive member 402 is vertically displaced (similar to the drive member 212 depicted in FIGS. 6A and 6B) the lead screws 400 are caused to rotate in opposite directions from one another via the threaded sections 440 of the drive member 402 which, in turn, moves the mounting arms 460. FIGS. 13 and 14 show that the cover 310 is shaped to limit the vertical displacement of the drive member 402. The mounting arms can be provided with grips 464 for engaging an outer enclosure panel or door of a shower.

Figure 11:
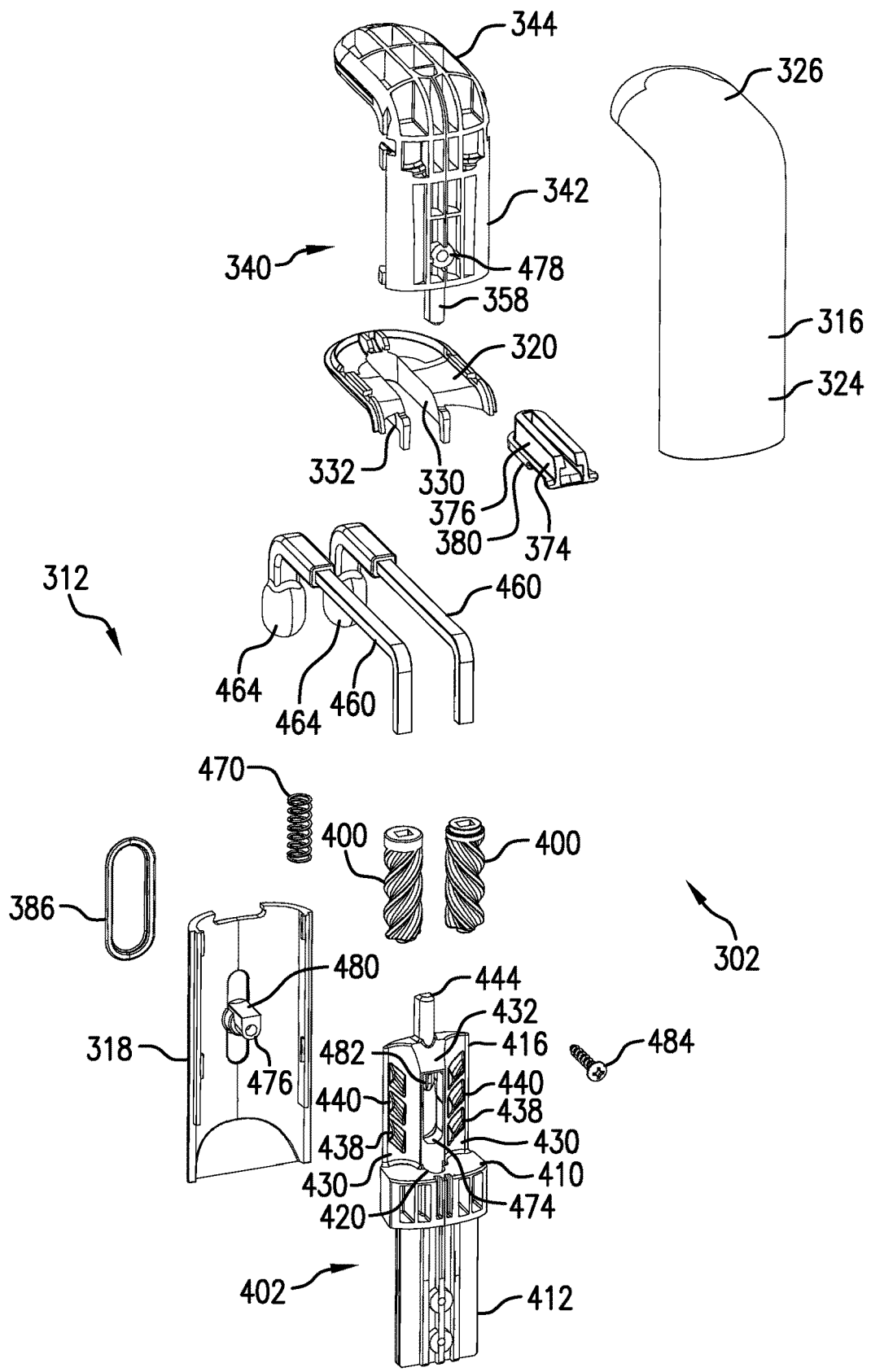
FIGS. 11 and 12 are exploded views of the attachment mechanism of FIG. 9.
Figure 12:
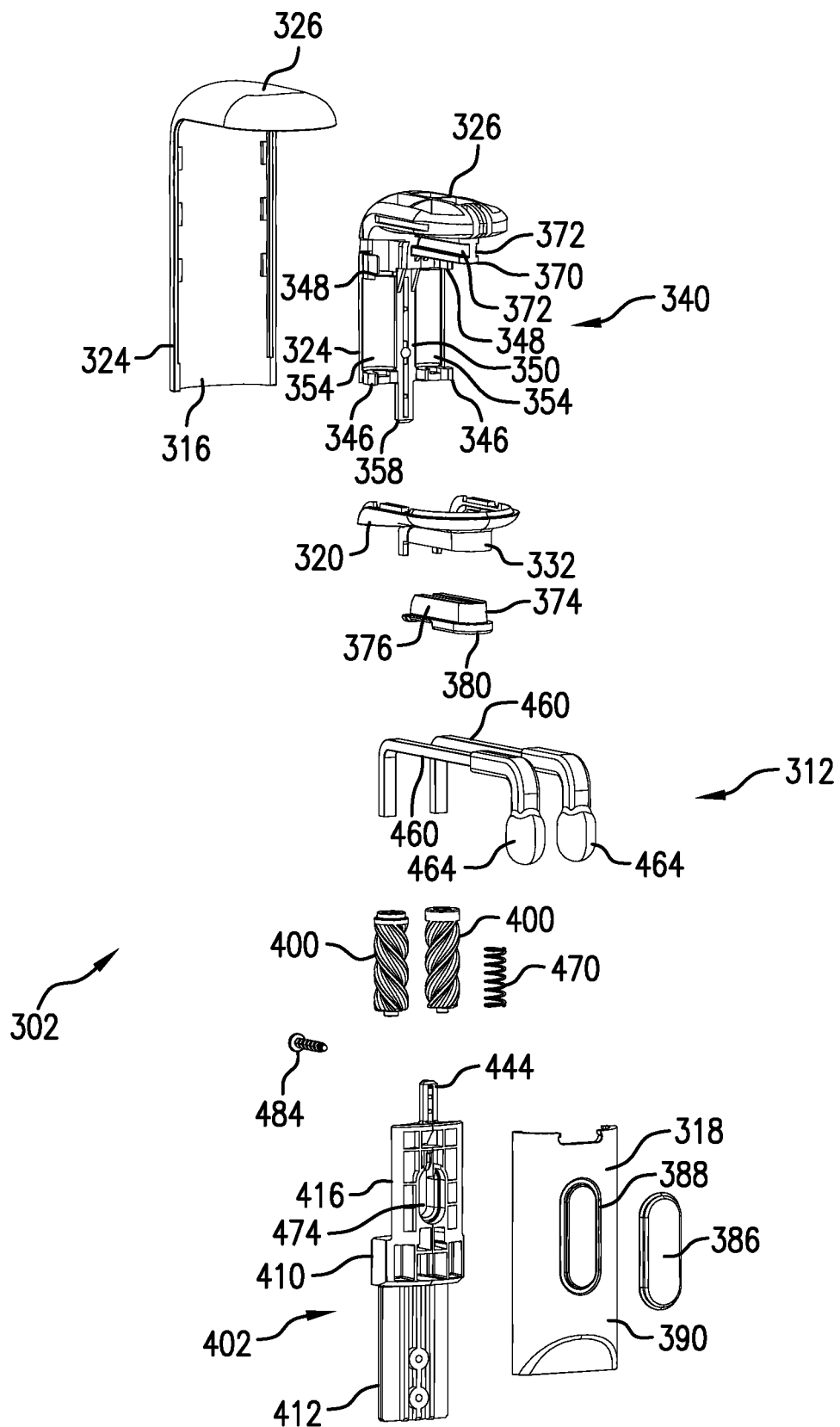

As depicted in FIGS. 11, 12 and 14, the drive assembly 312 can further include a biasing member (such as the depicted spring 470) mounted to the drive member 402 which normally biases the mounting arms 460 toward their rest position. In the depicted embodiment, the divider 432 of the drive member 402 includes a slotted opening 474 sized to receive the spring 470. The opening 474 is also sized to receive a mounting boss 476 on the second cover part 318. The mounting boss 476 is fastened to a corresponding mounting boss 478 on the support member 340 via a fastener 484. According to one aspect, the mounting boss 476 can include a planar surface 480 which when received in the opening 474 faces a projection 482 extending from an inner surface of the drive member 402 that define the opening 474. The spring 470 has one end mounted to the projection 482 and an opposite end seated on the planar surface 480. As the spine 106 of the shower caddy 100 is moved downward relative to the attachment mechanism 302 via the force of gravity (and the mounting arms 460 move toward their engagement position) the spring 470 is compressed within the opening 474. When the shower caddy is to be removed, the biasing force of the compressed spring 470 assists in the movement of the spine 106 back toward the attachment mechanism 302.

The operation of the attachment mechanism 302 is similar to that of the attachment mechanism 102. As the user places the exemplary attachment mechanism 302 of the shower caddy 100 over the top of an outer enclosure panel or door of a shower the force imparted on the mounting arms 460 from the downward weight of the shower caddy 100 (i.e., from the force of gravity) will cause the drive member 402 to move downward rotating the lead screws 400 about axes that extend parallel to the force of gravity. This, in turn, causes the mounting arms 460 to rotate until they grasp the back side of the enclosure panel or door. Again, it should be appreciated that the more weight that is placed on the shower caddy 100 the tighter the mounting arms 460 hold the shower caddy 100 in place. When the shower caddy 100 is to be removed, the user can move the spine 106 back toward the attachment mechanism 302, which vertically displaces the drive member 402 back into the cover 310. As the drive member 402 moves the lead screws 400 rotate in an opposite direction, thereby moving the mounting arms 460 (with the assistance of the spring 470) to their respective rest positions.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the present disclosure and following claims.

The invention claimed is:

1. A shower caddy for attachment to an associated outer enclosure panel or door of an associated shower or tub enclosure, the shower caddy comprising:
    a body and an attachment mechanism mounted on an end portion of the body, the attachment mechanism having at least one movable mounting arm, wherein the attachment mechanism is configured such that downward movement of the body relative to the attachment mechanism by force of gravity moves the mounting arm from a rest position toward an engagement position where the mounting arm is engageable with the associated outer enclosure panel or door.

2. The shower caddy of claim 1, wherein in the rest position the at least one mounting arm extends forward from the attachment mechanism and in the engagement position the at least one mounting arm extends from a side of the attachment mechanism, the at least one mounting arm moves between the rest position and the engagement position in a common plane that is transverse to the force of gravity.

3. The shower caddy of claim 1, wherein the attachment mechanism includes a drive assembly interconnecting the body and the at least one mounting arm, the drive assembly operable by the movement of the body relative to the attachment mechanism.

4. The shower caddy of claim 3, wherein the drive assembly includes at least one lead screw connected to the at least one mounting arm and a drive member displaceable by the movement of the body to drive or rotate the at least one lead screw.

5. The shower caddy of claim 4, wherein the drive assembly includes a pair of lead screws each driven by the displacement of the drive member, and the at least one mounting arm is a pair of movable mounting arms that are directly secured to the lead screws.

6. The shower caddy of claim 5, wherein the drive member includes male threaded sections for threadingly engaging the lead screws, wherein as the drive member is displaced the lead screws are caused to rotate in opposite directions from one another via the male threaded sections of the drive member which, in turn, moves the mounting arms, the mounting arms rotating together and in sync with the displacement of the drive member.

7. The shower caddy of claim 6, wherein the drive member includes a pair of arcuate portions that at least partially enclose the lead screws, each of the arcuate portions includes one of the male threaded sections.

8. The shower caddy of claim 7, wherein each of the arcuate portions includes spaced angled ribs which together define one of the male threaded sections.

9. The shower caddy of claim 6, including a cover for housing both the drive assembly and a separate support member secured to the cover, the support member adapted to rotationally support the lead screws.

10. The shower caddy of claim 9, wherein the support member includes a pair of lower platforms and a pair of corresponding upper platforms, the lead screws rotationally supported by the lower and upper platforms of the support member.

11. The shower caddy of claim 5, wherein the drive assembly is configured to move the mounting arms from the engagement position toward the rest position upon upward movement of the body relative to the attachment mechanism.

12. The shower caddy of claim 11, wherein the drive assembly includes a biasing member supported by the drive member, the biasing member normally biasing the mounting arms toward their rest position, the biasing member compressed by the movement of the mounting arms toward their engagement position.

13. The shower caddy of claim 1, wherein the at least one mounting arm is rotatable about an axis that extends parallel to the force of gravity.

14. A shower caddy comprising:
a body and an attachment mechanism mounted on an end portion of the body for releasably attaching the shower caddy to an associated outer enclosure panel or door of an associated shower or tub enclosure, the attachment mechanism including:
a cover for housing a drive assembly operable by movement of the body relative to the attachment mechanism, and mounting arms connected to the drive assembly, the drive assembly operably to move the mounting arms between a rest position where the mounting arms extend forward from the attachment mechanism and an engagement position where the mounting arms extend from opposite sides of the attachment mechanism for engaging the associated enclosure panel or door.

15. The shower caddy of claim 14, wherein the drive assembly includes lead screws connected to the mounting arms and a drive member connected to the end portion of the body, the drive member displaceable by the body to drive or rotate the lead screws.

16. The shower caddy of claim 15, wherein the drive member includes male threaded sections for threadingly engaging the lead screws, wherein as the drive member is displaced the lead screws are caused to rotate in opposite directions from one another via the male threaded sections of the drive member which, in turn, moves the mounting arms, the mounting arms rotating together and in sync with the displacement of the drive member.

17. The shower caddy of claim 16, wherein each of the male threaded sections is defined by spaced angled ribs formed integral with the drive member.

18. The shower caddy of claim 16, further including a support member housed in the cover, the support member adapted to rotationally support the lead screws.

19. The shower caddy of claim 14, wherein the drive assembly is configured such that downward movement of the body relative to the attachment mechanism moves the mounting arms from the rest position to the engagement position, and upward movement of the body relative to the attachment mechanism moves the mounting arms from the engagement position to the rest position.

* * * * *